United States Patent
DiCintio et al.

(10) Patent No.: US 10,816,208 B2
(45) Date of Patent: Oct. 27, 2020

(54) FUEL INJECTORS AND METHODS OF FABRICATING SAME

(71) Applicant: General Electric Company, Schenectady, NY (US)

(72) Inventors: Richard Martin DiCintio, Simpsonville, SC (US); Seth Reynolds Hoffman, Spartanburg, SC (US); Jayaprakash Natarajan, Greer, SC (US)

(73) Assignee: General Electric Company, Schenectady, NY (US)

( * ) Notice: Subject to any disclaimer, the term of this patent is extended or adjusted under 35 U.S.C. 154(b) by 286 days.

(21) Appl. No.: 15/410,831

(22) Filed: Jan. 20, 2017

(65) Prior Publication Data

US 2018/0209653 A1    Jul. 26, 2018

(51) Int. Cl.
| | | |
|---|---|---|
| *F23R 3/28* | (2006.01) | |
| *F02C 3/04* | (2006.01) | |
| *F01D 9/04* | (2006.01) | |
| *F23R 3/34* | (2006.01) | |

(52) U.S. Cl.
CPC ............. *F23R 3/286* (2013.01); *F01D 9/041* (2013.01); *F02C 3/04* (2013.01); *F23R 3/283* (2013.01); *F23R 3/346* (2013.01); *F05D 2220/32* (2013.01); *F05D 2230/50* (2013.01); *F23R 2900/00017* (2013.01); *F23R 2900/00018* (2013.01)

(58) Field of Classification Search
CPC .. F23R 3/28; F23R 3/283; F23R 3/286; F23R 3/34; F23R 3/346; F02C 7/22; F02C 7/222; F02C 7/228
See application file for complete search history.

(56) References Cited

U.S. PATENT DOCUMENTS

| | | |
|---|---|---|
| 4,903,480 A | 2/1990 | Lee et al. |
| 5,220,787 A | 6/1993 | Bulman |
| 5,640,851 A | 6/1997 | Toon et al. |
| 6,915,636 B2 | 7/2005 | Stuttaford et al. |
| 7,878,000 B2 | 2/2011 | Mancini et al. |
| 8,113,001 B2 | 2/2012 | Singh et al. |
| 8,171,735 B2 | 5/2012 | Mancini et al. |
| 8,387,391 B2 | 3/2013 | Patel et al. |
| 8,438,856 B2 | 5/2013 | Chila et al. |
| 8,590,311 B2 | 11/2013 | Parsania et al. |
| 8,656,699 B2 * | 2/2014 | Saito .................. F23R 3/14 60/39.26 |

(Continued)

*Primary Examiner* — Arun Goyal
(74) *Attorney, Agent, or Firm* — Charlotte C. Wilson; James W. Pemrick

(57) ABSTRACT

A fuel injector for a gas turbine combustor includes a fuel conduit fitting and a nozzle having an inlet portion defining a mixing chamber therein. The inlet portion includes a plurality of circumferentially-spaced vanes that define a plurality of inlet flow paths within the mixing chamber. Each vane has at least one port defined therein that is in flow communication with the fuel conduit fitting such that fuel from the fuel conduit fitting is dischargeable into at least one of the inlet flow paths via the at least one port. The resulting fuel/air mixture is delivered into a secondary combustion zone of the gas turbine combustor. A gas turbine including the fuel injector and a method of fabricating the fuel nozzle are also provided.

19 Claims, 7 Drawing Sheets

(56) References Cited

U.S. PATENT DOCUMENTS

| | | | |
|---|---|---|---|
| 8,745,987 B2 | 6/2014 | Stoia et al. | |
| 8,863,525 B2 | 10/2014 | Toronto et al. | |
| 9,097,184 B2 * | 8/2015 | Stryapunin | F02C 7/22 |
| 9,267,436 B2 | 2/2016 | Stoia et al. | |
| 9,291,350 B2 | 3/2016 | Melton et al. | |
| 9,303,872 B2 | 4/2016 | Hadley et al. | |
| 9,310,078 B2 * | 4/2016 | Chen | F23R 3/045 |
| 9,316,155 B2 | 4/2016 | DiCintio et al. | |
| 9,316,396 B2 | 4/2016 | DiCintio et al. | |
| 9,322,556 B2 | 4/2016 | Melton et al. | |
| 9,360,217 B2 | 6/2016 | DiCintio et al. | |
| 9,360,221 B2 * | 6/2016 | Butler | F23R 3/286 |
| 9,376,961 B2 | 6/2016 | Stoia et al. | |
| 9,383,104 B2 | 7/2016 | Melton et al. | |
| 9,400,114 B2 | 7/2016 | Melton et al. | |
| 2014/0260280 A1 | 9/2014 | Willis et al. | |
| 2014/0260318 A1 | 9/2014 | Willis et al. | |
| 2014/0360193 A1 | 12/2014 | Stoia et al. | |
| 2016/0298845 A1 * | 10/2016 | Nagai | F23R 3/14 |
| 2017/0089582 A1 * | 3/2017 | Carrotte | F23R 3/14 |

* cited by examiner

FUEL INJECTORS AND METHODS OF FABRICATING SAME

TECHNICAL FIELD

The field of this disclosure relates generally to fuel injectors for combustors in gas turbine assemblies and, more particularly, to secondary fuel injectors for use with an axial fuel staging (AFS) system used in combustors of a gas turbine assembly.

BACKGROUND

At least some known gas turbine assemblies include a compressor, a combustor, and a turbine. Gas (e.g., ambient air) flows through the compressor, where the gas is compressed before delivery to one or more combustors. In each combustor, the compressed air is combined with fuel and ignited to generate combustion gases. The combustion gases are channeled from each combustor to and through the turbine, thereby driving the turbine, which, in turn, powers an electrical generator coupled to the turbine. The turbine may also drive the compressor by means of a common shaft or rotor.

In some combustors, the generation of combustion gases occurs at two axially spaced stages. Such combustors are referred to herein as including an "axial fuel staging" (AFS) system, which delivers fuel and an oxidant to one or more downstream fuel injectors. In a combustor with an AFS system, a primary fuel nozzle at an upstream end of the combustor injects fuel and air (or a first fuel/air mixture) in an axial direction into a primary combustion zone, and an AFS fuel injector located at a position downstream of the primary fuel nozzle injects fuel and air (or a second fuel/air mixture) in a radial direction into a secondary combustion zone downstream of the primary combustion zone.

In some cases, it is desirable to introduce the fuel and air into the secondary combustion zone as a mixture. Therefore, the mixing capability of the AFS injector influences the overall operating efficiency and/or emissions of the gas turbine.

SUMMARY

In one aspect, a fuel injector is provided. The fuel injector includes a fuel conduit fitting and a nozzle having an inlet portion defining a mixing chamber therein. The inlet portion includes a plurality of circumferentially-spaced vanes that define between them a plurality of inlet flow paths into the mixing chamber. Each vane has at least one port defined therein that is in flow communication with the fuel conduit fitting such that fuel from the fuel conduit fitting is dischargeable into at least one of the inlet flow paths via the at least one port.

In another aspect, a method of fabricating a fuel injector is provided. The method includes forming a fuel conduit fitting and forming a nozzle that includes an inlet portion defining a mixing chamber therein. The inlet portion includes a plurality of circumferentially-spaced vanes that define between them a plurality of inlet flow paths into the mixing chamber. Each vane has at least one port defined therein that is in flow communication with the fuel conduit fitting such that fuel from the fuel conduit fitting is dischargeable into at least one of the inlet flow paths via the at least one port.

In another aspect, a gas turbine assembly is provided. The gas turbine assembly includes a compressor and a combustor coupled in flow communication with the compressor. The combustor includes an axial fuel staging (AFS) system having a secondary fuel injector. The secondary fuel injector includes a fuel conduit fitting and a nozzle having an inlet portion defining a mixing chamber therein. The inlet portion includes a plurality of circumferentially-spaced vanes that define between them a plurality of inlet flow paths into the mixing chamber. Each vane has at least one port defined therein that is in flow communication with the fuel conduit fitting such that fuel from the fuel conduit fitting is dischargeable into at least one of the inlet flow paths via the at least one port.

BRIEF DESCRIPTION OF THE DRAWINGS

A full and enabling disclosure of the present products and methods, including the best mode thereof, directed to one of ordinary skill in the art, is set forth in the specification, which makes reference to the appended Figures, in which.

DETAILED DESCRIPTION

The following detailed description illustrates various fuel injectors, their component parts, and methods of fabricating the same, by way of example and not limitation. The description enables one of ordinary skill in the art to make and use the fuel injectors. The description provides several embodiments of the fuel injectors, including what is presently believed to be the best modes of making and using the fuel injectors. An exemplary fuel injector is described herein as being coupled within a combustor of a heavy duty gas turbine assembly. However, it is contemplated that the fuel injectors described herein have general application to a broad range of systems in a variety of fields other than electrical power generation.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. Within a combustion can, the combustion products flow from an upstream, or forward, end of the combustor to a downstream, or aft, end of the combustor before being directed into the turbine.

As used herein, the terms "primary" and "secondary" are indicators of the relative locations of components with "primary" components being located upstream of "secondary" components, based on the flow direction of combustion products through the combustor (i.e., in a direction from the compressor to the turbine). These terms are not intended to be indicative of the importance or size of the individual components.

As used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the term "circumference" (or any variation thereof) refers to a dimension extending around a center of any suitable shape (e.g., a square, a rectangle, a triangle, etc.) and is not limited to a dimension extending around a center of a circular shape.

The terminology used herein is for the purpose of describing particular embodiments only and is not intended to be limiting. As used herein, the singular forms "a", "an", and "the" are intended to cover the plural forms as well, unless the context clearly indicates otherwise. It will be further understood that the terms "comprises" or "comprising," when used in the specification, specify the presence of stated features, elements, and/or components, but does not preclude the presence or addition of one or more other features, elements, and/or components.

Figure 1:
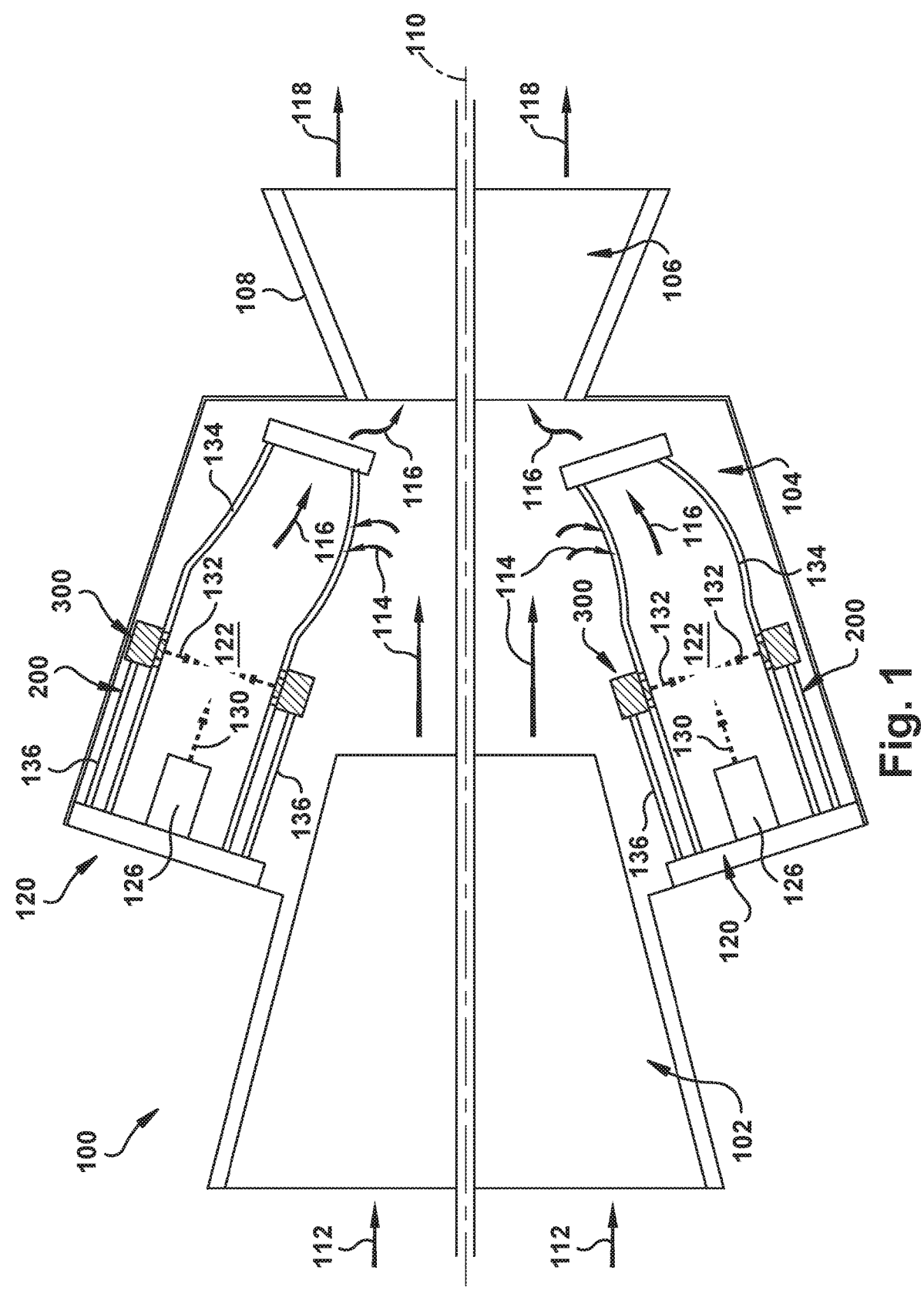
FIG. 1 is a schematic illustration of an exemplary turbine assembly.

Turning now to the Figures, FIG. 1 schematically illustrates an exemplary turbine assembly 100. In the exemplary embodiment, turbine assembly 100 is a gas turbine assembly having a compressor 102, a combustor 104, and a turbine 106 coupled in flow communication with one another within a casing 108 and spaced along a common rotor defining a centerline axis 110. In operation, a working gas 112 (e.g., ambient air) flows into the compressor 102 and is compressed and channeled through the casing 108 into the combustor 104. Compressed gas 114 is mixed with fuel and ignited in the combustor 104 to generate combustion gases 116 that are channeled into the turbine 106 and then discharged from the turbine 106 as an exhaust stream 118.

In the exemplary embodiment, the combustor 104 includes a plurality of combustion cans 120, and each combustion can 120 includes a sleeve assembly 134 that defines a combustion chamber 122 into which fuel (not shown) and compressed gas 114 are injected via a fuel delivery system (including, e.g., an AFS system 200). The combustion can 120 includes a primary fuel nozzle 126 at a forward (or upstream) end, and the AFS system 200 includes a secondary fuel injector 300 positioned axially downstream from the primary fuel nozzle 126. The primary fuel nozzle 126 injects a first mixture 130 of fuel and compressed gas 114 into a primary combustion zone within the combustion chamber 122, and the secondary fuel injector 300 injects a second mixture 132 of fuel and compressed gas 114 into a secondary combustion zone within the combustion chamber 122. A conduit assembly 136 supplies fuel and/or compressed gas to any one or more of the secondary fuel injectors 300.

FIG. 1 illustrates two oppositely disposed secondary fuel injectors 300 per combustion can 120. However, in other embodiments, the combustion can 120 may have any suitable number or arrangement of fuel injectors, including fuel injectors that are located in different axial planes and/or fuel injectors that are spaced unevenly from one another in a circumferential direction. Moreover, while each fuel injector 300 is illustrated as having a dedicated conduit assembly 136, it should be understood that a single conduit assembly (e.g., an assembly having a single inlet and branches) may be used to supply fuel and/or compressed air to more than one of the fuel injectors 300. Thus, there is no requirement that the number of conduit assemblies 136, as discussed further below, be equal to the number of fuel injectors 300.

Figure 2:
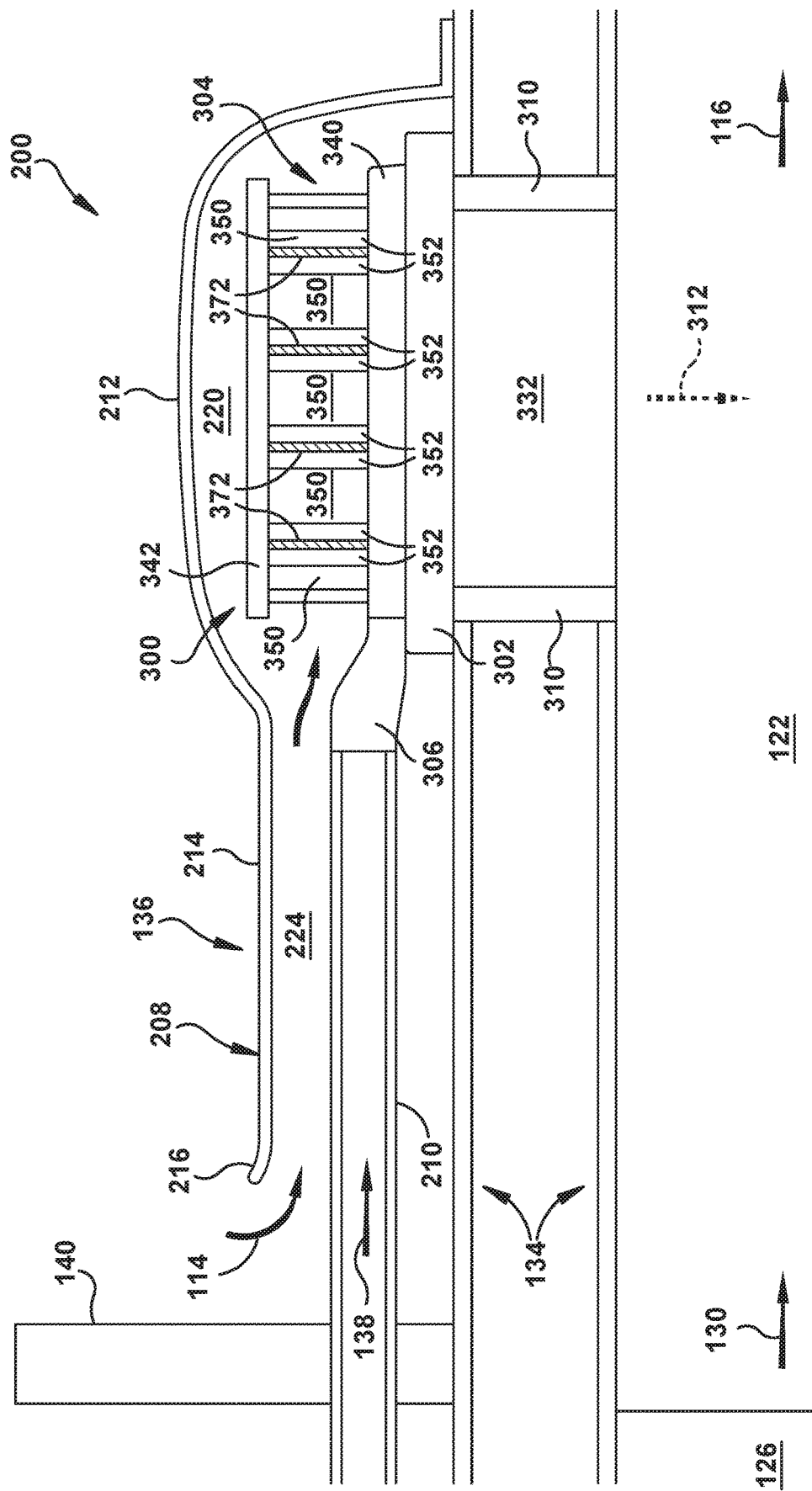
FIG. 2 is a schematic illustration of an exemplary AFS system for use in the turbine assembly shown in FIG. 1.

FIG. 2 is a schematic representation of the exemplary AFS system 200 for use in the combustor 104 of the turbine assembly 100. In the exemplary embodiment, the AFS system 200 includes one or more secondary fuel injectors 300 coupled to the sleeve assembly 134, and a respective conduit assembly 136 for supplying fuel 138 and compressed gas 114 to each of the secondary fuel injectors 300. The conduit assembly 136 includes a first conduit 208 and a second conduit 210 positioned within first conduit 208. The first conduit 208 includes a housing segment 212 radially outward of the fuel injector 300 and an extension segment 214 coupled to, or formed integrally with, the housing segment 212. The second conduit 210 supplies fuel to the fuel injector 300, being coupled at a downstream end to the fuel injector 300 and extending upstream through a casing flange 140 that supports the combustion can 120 to receive fuel from a fuel supply (not shown).

The first conduit 208 is coupled to the sleeve assembly 134 such that the housing segment 212 covers the secondary fuel injector 300 and the extension segment 214 covers the second conduit 210 from the housing segment 212 to an inlet end 216 of the extension segment 214 positioned near the casing flange 140 and in a spaced relation therefrom. The housing segment 212 defines an environment 220 around the secondary fuel injector 300, and the extension segment 214 defines a channel 224 around the second conduit 210. The channel 224 is in flow communication with the casing 108 and the environment 220. In other embodiments, the extension segment 214 of the first conduit 208 may be coupled directly to the secondary fuel injector 300, or otherwise oriented in flow communication with the secondary fuel injector 300 (e.g., in some embodiments, the first conduit 208 may not include the housing segment 212 and may not enclose the environment 220).

During operation of the turbine assembly 100, compressed gas 114 flows into the secondary fuel injector 300 via the inlet end 216 of first conduit 208. More specifically, compressed gas 114 flows from the inlet end 216, along the channel 224, and into environment 220. Compressed gas 114 then flows into the secondary fuel injector 300 via a nozzle portion 304 of the secondary fuel injector 300. As shown in more detail in FIGS. 3 and 4, the nozzle 304 includes a number of vanes 350 with an inlet flow path 352 positioned between adjacent vanes 350, such that compressed gas 114 flows through the inlet flow paths 352 into the interior portion of the secondary fuel injector 300 where it mixes with fuel 138. Fuel 138 is delivered through the second conduit 210, a conduit fitting 306, a base 340, and fuel injection ports 356 (shown in FIG. 5) in each vane 350. The second fuel/air mixture 132 is conveyed through a duct 332 defined by a bottom portion 310 of the secondary fuel injector 300 and is injected into the secondary combustion zone of the combustion chamber 122.

Simultaneously, the primary fuel injector 126 injects the first fuel/air mixture 130 into the primary combustion zone of the combustion chamber 122 upstream from the introduction plane of the second fuel/air mixture 132. The first and second mixtures 130 and 132, respectively, are then ignited inside the combustion chamber 122 to generate combustion gases 116 that flow downstream into the turbine 106. Notably, to enhance the operating efficiency of the turbine assembly 100, it is desirable for the secondary fuel injector 300 to thoroughly mix fuel 138 and compressed gas 114 to form the second mixture 132. In that regard, the secondary fuel injector embodiments set forth below facilitate improved mixing.

Figure 3:
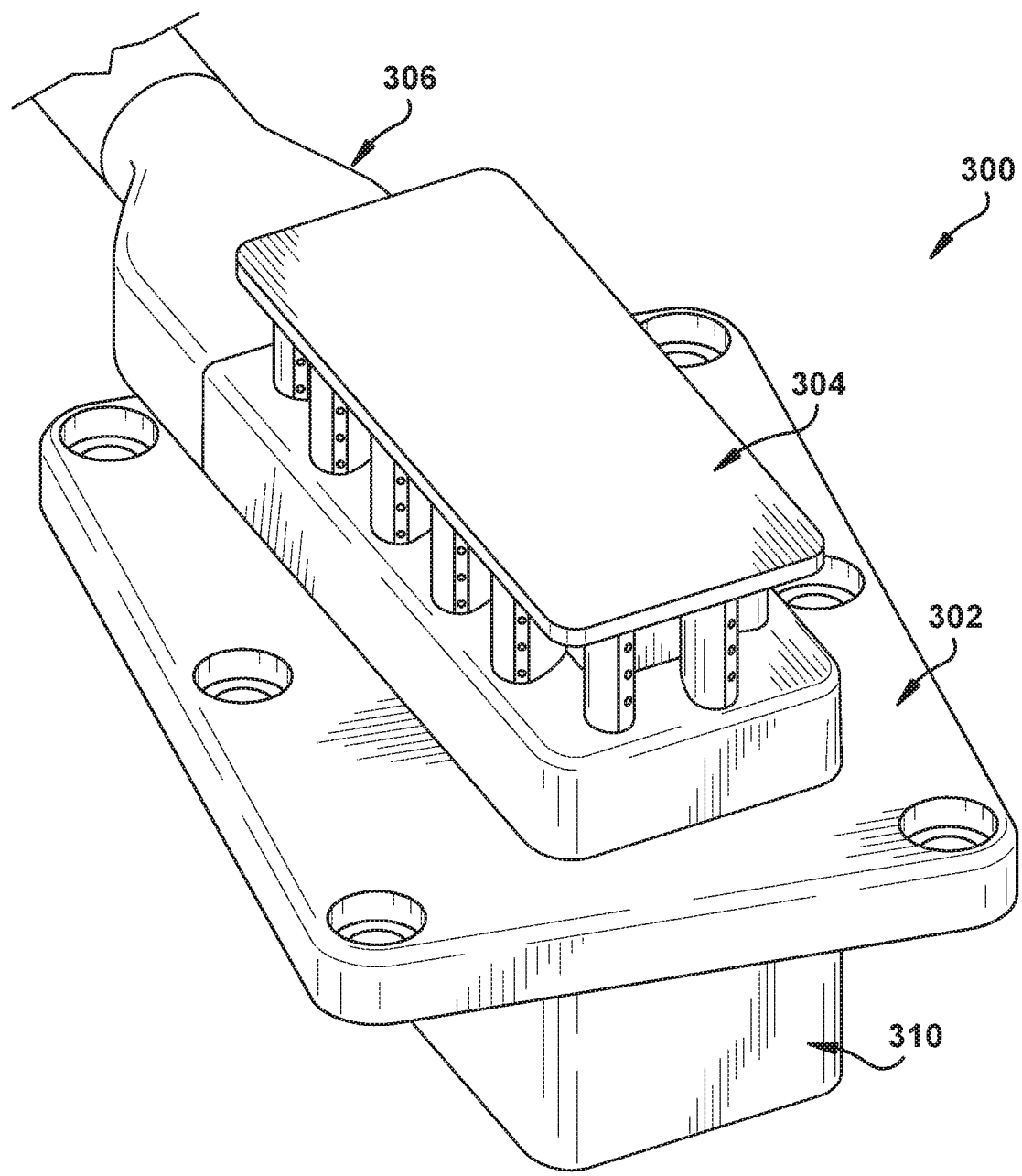
FIG. 3 is a perspective view of an exemplary secondary fuel injector for use in the AFS system shown in FIG. 2.

FIG. 3 is a perspective view of one embodiment of the present secondary fuel injector 300 for use in the AFS system 200. In this exemplary embodiment, the secondary fuel injector 300 includes a plate 302, the nozzle portion 304, and the conduit fitting 306 that are formed integrally together as a unitary (i.e., single-piece) structure. The bottom portion 310 of the secondary fuel injector 300 extends from the plate 302 opposite the nozzle portion 304. The plate 302 couples the nozzle 304 to the sleeve assembly 134, and, as described above, the conduit fitting 306 couples the nozzle 304 in flow communication with the second conduit 210 of conduit assembly 136.

In some embodiments, the plate 302 and/or the conduit fitting 306 may be formed independently, and then coupled to the nozzle 304 in any suitable manner (e.g., using any suitable fastener or joining technique) that enables the secondary fuel injector 300 to function as described herein. In other embodiments, the secondary fuel injector 300 may have any suitable structure in lieu of, or in combination with, the plate 302 that facilitates coupling the secondary fuel injector 300 to the sleeve assembly 134 in any suitable manner that enables the fuel injector 300 to function as described herein.

Figure 4:
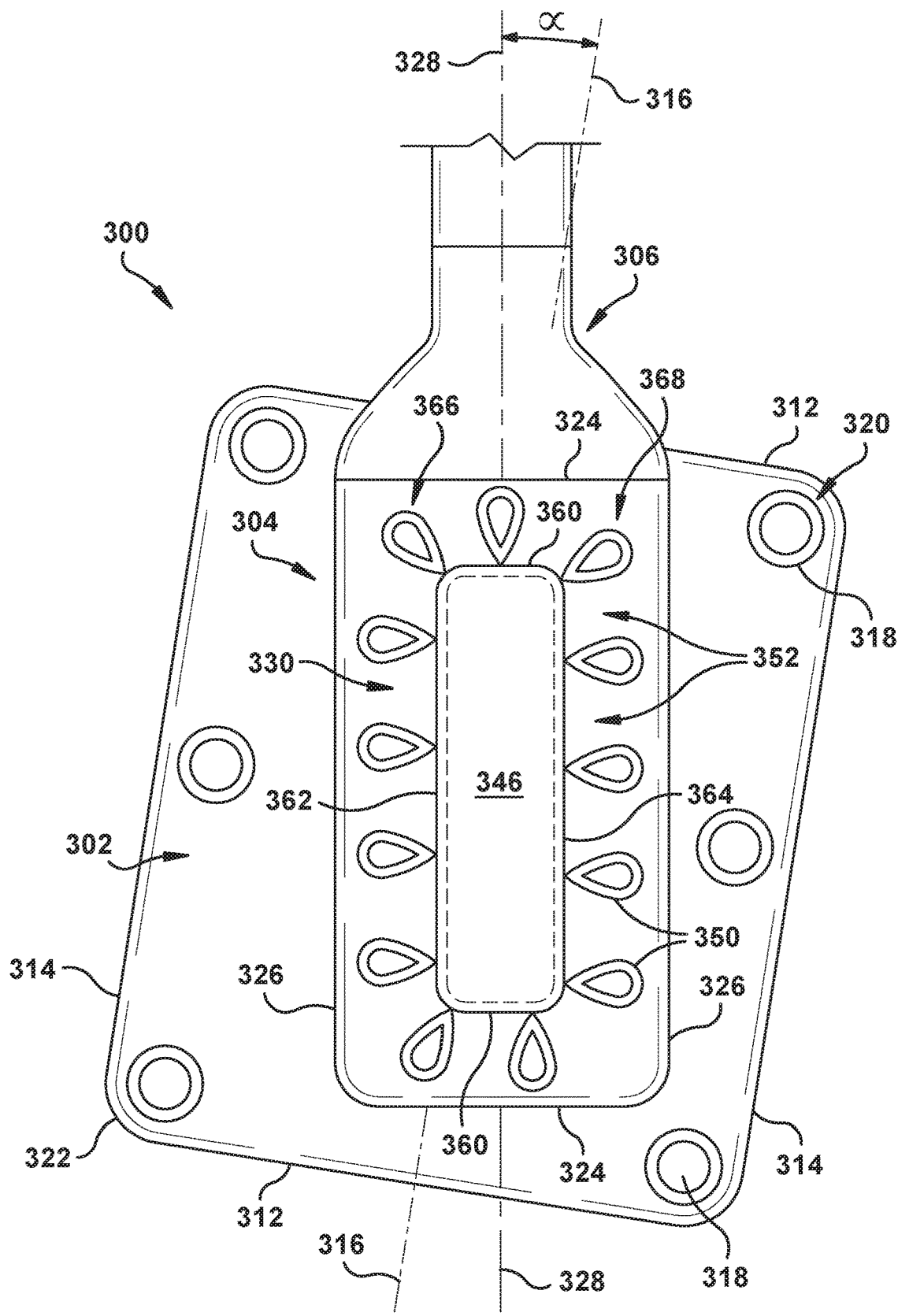
FIG. 4 is a cross-sectional view of the secondary fuel injector shown in FIG. 3.

FIG. 4 is a cross-sectional view of an inlet portion 308 of the secondary fuel injector 300. In the exemplary embodiment, the plate 302 has a shape that includes a pair of end segments 312 and a pair of side segments 314 that extend between the end segments 312. Each side segment 314 may be substantially straight or may be contoured at least partly inwardly between the end segments 312 (i.e., each side segment 314 may be at least partly concave between the end segments 312). Each end segment 312 may be substantially straight or may have a contour that is at least partly curved outwardly between the side segments 314 (i.e., the end segments 312 may be at least partly convex between the side segments 314).

Alternately, the end segments 312 may also be curved in a concave shape. Moreover, the side segments 314 are longer than the end segments 312 such that the shape of the plate 302 is elongated (e.g., generally rectangular) and is oriented along a longitudinal plate axis 316 extending through the end segments 312 and between the side segments 314. In other embodiments, the plate 302 may have any other shape that enables the plate 302 to function as described herein. For instance, the plate 302 may not be flat, but may have a degree of curvature complementary to the shape of the sleeve assembly 134.

In the exemplary embodiment, the plate 302 has a plurality of apertures 318 that are each sized to receive a fastener (not shown) (such as, for example, a screw or bolt) that facilitates coupling the secondary fuel injector 300 to the sleeve assembly 134. The apertures 318 may be arranged in a pair of rows 320, and each row 320 is adjacent to one of the side segments 314. If the side segment 314 is curved, each row 320 may be oriented to substantially mirror the curvature of the immediately adjacent side segment 314 (e.g., each row 320 of the apertures 318 may be oriented in a concave arrangement that substantially mirrors the arcuate shape of the immediately adjacent side segment 314).

Although each row 320 is illustrated with three apertures 318 in the exemplary embodiment, each row 320 may include any suitable number of apertures 318. Moreover, although the apertures 318 are arranged in rows 320 in the exemplary embodiment, the apertures 318 may be arranged in any suitable orientation in other embodiments. For example, in an alternate embodiment, the plate 302 may include only four apertures 318 that are each defined at a respective corner 322 of the plate 302. In other embodiments, the plate 302 may not include any apertures 318. For example, in such embodiments, the plate 302 may include other suitable attachment structure(s), in lieu of the apertures 318, that facilitates coupling the secondary fuel injector 300 to the sleeve assembly 134.

In the exemplary embodiment, the nozzle 304 has a shape that includes a pair of end segments 324 and a pair of side segments 326 that extend between the end segments 324. The side segments 326 are longer than the end segments 324 such that the shape of the nozzle 304 is elongated (e.g., generally rectangular) and is oriented along a longitudinal nozzle axis 328 extending through the end segments 324 and between the side segments 326. In one embodiment, the longitudinal nozzle axis 328 is offset (or skewed) relative to the longitudinal plate axis 316 such that an acute angle α ("alpha") is defined between the axes 316 and 328.

Moreover, the conduit fitting 306 is formed integrally with the nozzle 304 at one of the end segments 324 such that the conduit fitting 306 projects from the nozzle 304 generally along the longitudinal nozzle axis 328. In other embodiments, the conduit fitting 306 may have any other suitable orientation relative to the nozzle 304, and the nozzle 304 may have any other suitable orientation relative to the plate 302 (e.g., the longitudinal axes 316 and 328 may be coincident or substantially parallel in other embodiments).

Figure 5:
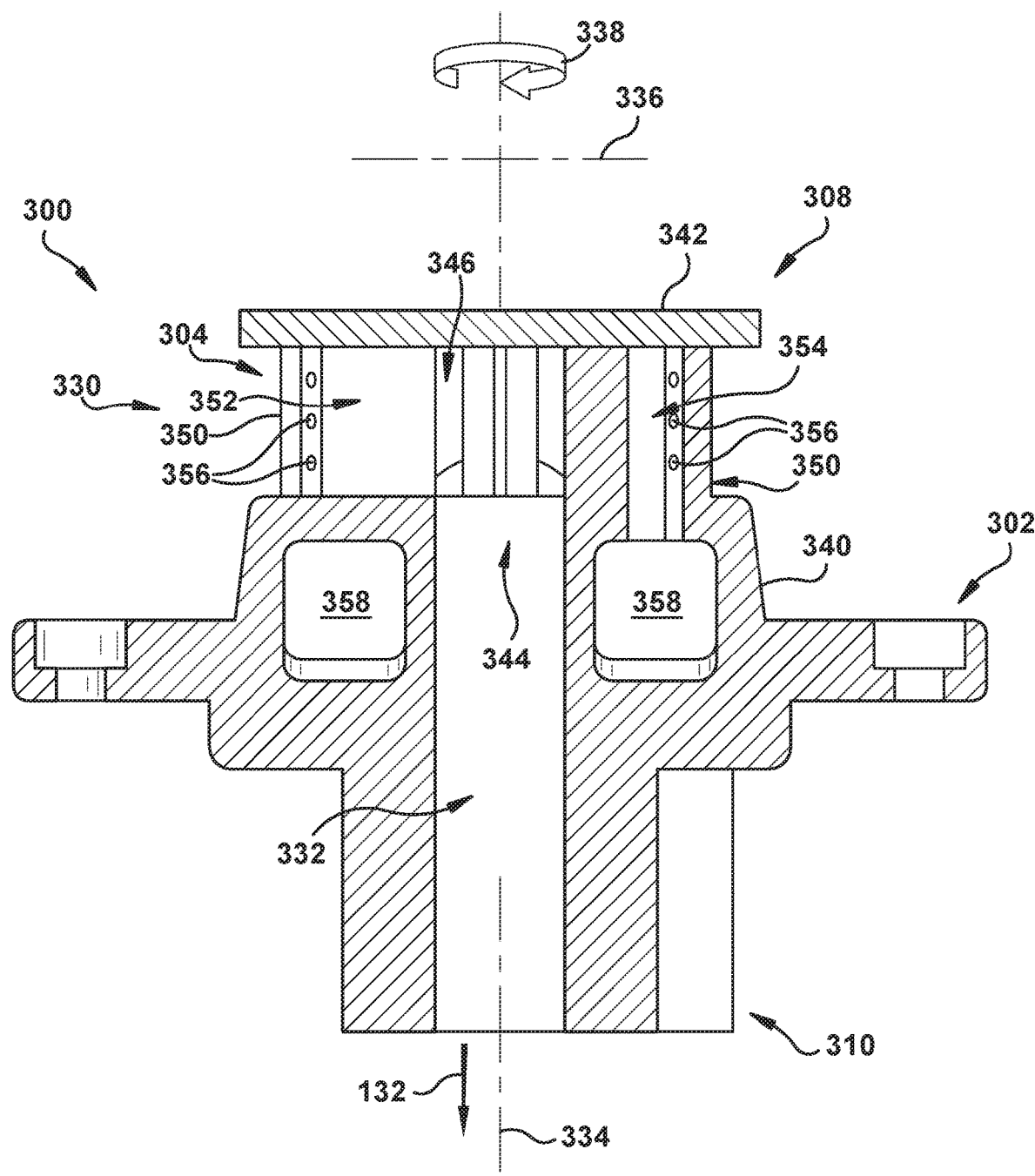
FIG. 5 is another cross-sectional view of the secondary fuel injector shown in FIG. 3.

The nozzle 304 includes a number of vanes 350 that are spaced circumferentially about a central region 346 of a mixing chamber 344 (as shown in FIG. 5). Inlet flow paths 352 are defined between adjacent vanes 350 and extend radially inward toward the central region 346. The central region 346 has a shape defined a pair of end segments 360 and a pair of side segments 362, 364 that extend between the end segments 360. The side segments 362, 364 are longer than the end segments 360, such that the shape of the central region 346 is elongated (e.g., generally rectangular or elliptical, if the end segments 360 are curved). In some embodiments, the shape of central region 346 of mixing chamber 344 may not be elongated (e.g., the shape of central region 346 may be generally square or circular), and the inlet flow paths 352 may not be directed substantially radially toward the central region 346.

The vanes 350 are arranged around the central region 346 with a first group 366 of vanes 350 extending along the first side segment 362, and a second group 368 of vanes 350 extending along the second side segment 364. In one embodiment, the vanes 350 of the first group 366 are offset (or interspaced) relative to the vanes 350 of the second group 368 across the central region 346. In other words, each first group vane 350 is radially aligned with an inlet flow path 352 defined between adjacent vanes 350 of the second group 368, and each second group vane 350 is radially aligned with an inlet flow path 352 defined between adjacent vanes 350 of the first group 366.

In other embodiments, the vanes 350 of the first group 366 and the second group 368 may not be offset (or interspaced) relative to one another across the central region 346, but rather may be radially aligned with one another across the central region 346. That is, each inlet flow path 352 on the first side segment 362 of the central region 346 may be radially aligned with an inlet flow path 352 on the second side segment 364 of the central region 346.

Figure 7:
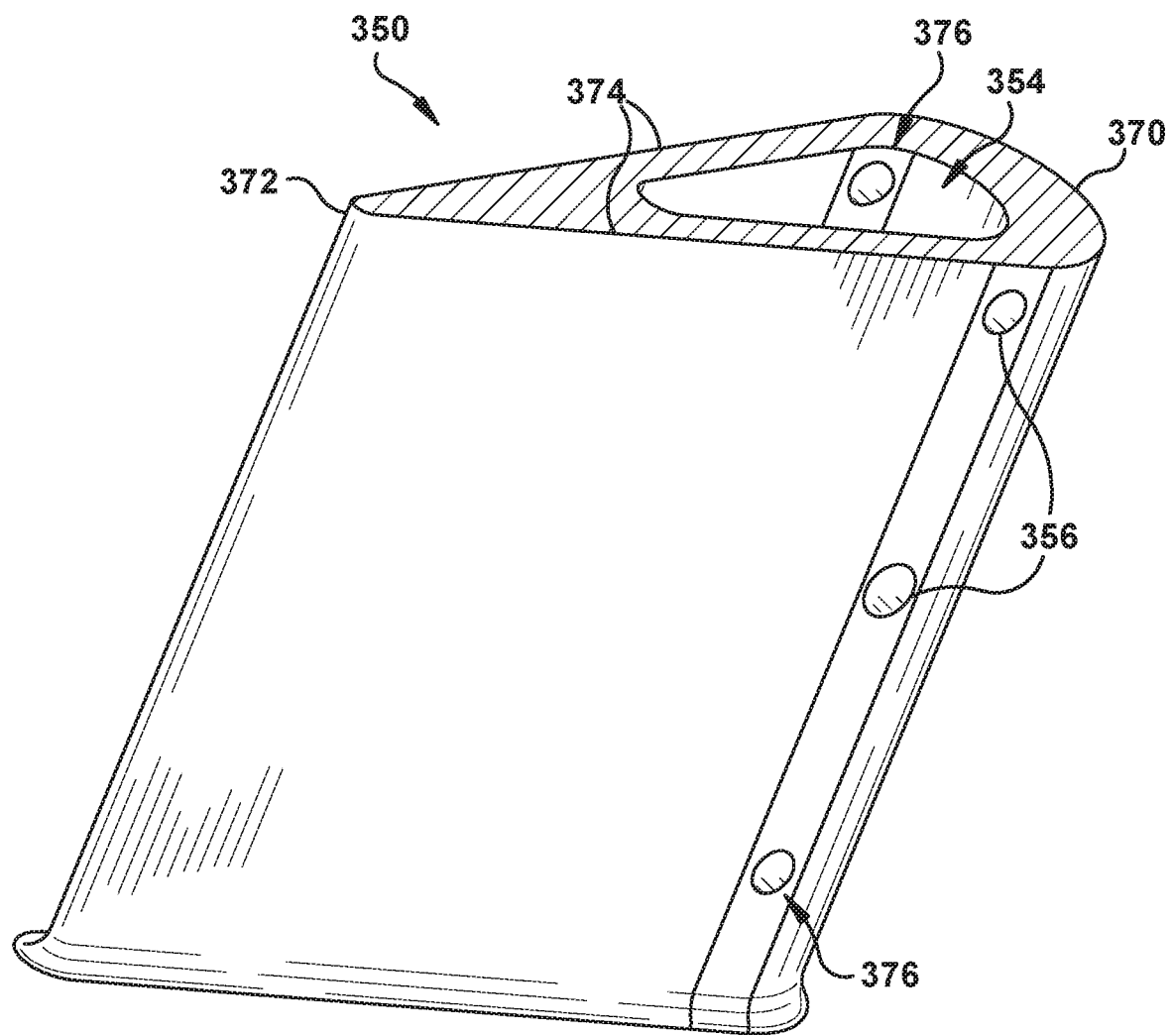
FIG. 7 is a perspective view of a vane of the secondary fuel injector shown in FIG. 3.

Each vane 350 has a generally symmetrical teardrop-shaped profile (as shown in FIG. 7), although the vanes 350 may have another shape and may not be symmetrical. The vanes 350 extend between the base 340 and a shield 342 (also shown in FIG. 5), the shield 342 defining a radially outermost surface of the secondary fuel injector 300 (relative to the flow path of the combustion products 116 through the combustion can 120).

Figure 6:
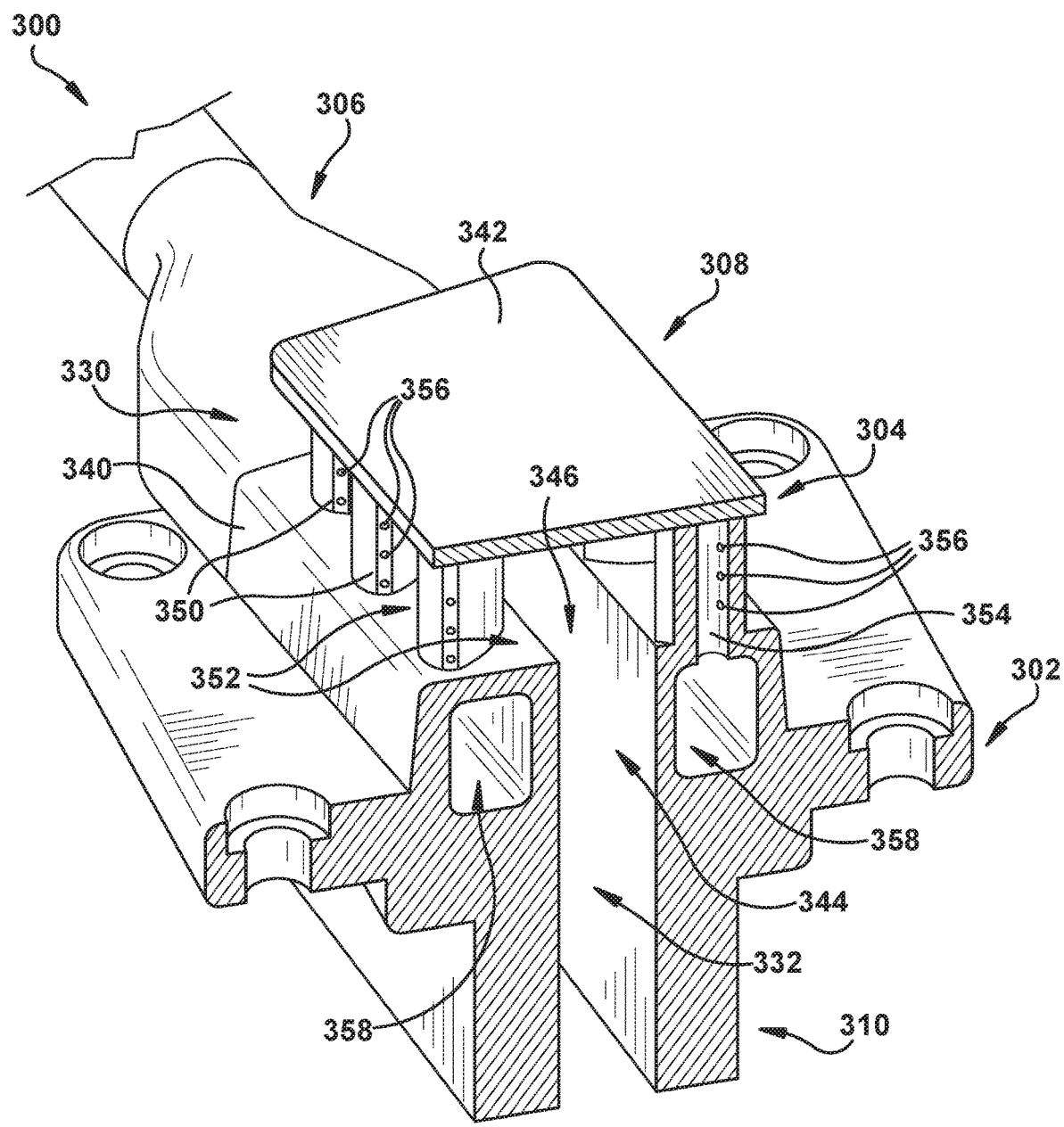
FIG. 6 is a perspective view of the cross-section shown in FIG. 5.

FIGS. 5 and 6 are cross-sectional views of the secondary fuel injector 300. In the exemplary embodiment, the inlet portion 308 of the nozzle 304 includes a vent portion 330, and the outlet portion 310 is defined by a duct 332 that is formed integrally with the vent portion 330 and that is in flow communication with the vent portion 330. The vent portion 330 is positioned partly above the plate 302, and the duct 332 extends radially outward through the plate 302 to the vent portion 330.

As set forth in more detail below, the vent portion 330 facilitates mixing fuel 138 and compressed gas 114 to form the second fuel/air mixture 132, such that the second fuel/air mixture 132 flows from the central region 346 of the vent portion 330 and through the mixing chamber 344 along an injection axis 334 of the duct 332. The second fuel/air mixture 132 flows through the duct 332 and into the secondary combustion zone of the combustion chamber 122. Although the injection axis 334 is linear in the exemplary embodiment, the injection axis 334 may be arcuate in other embodiments (e.g., the duct 332 may have an arcuate shape). Accordingly, the secondary fuel injector 300 has a radial dimension 336 extending generally perpendicularly to the injection axis 334 and a circumferential dimension 338 extending about the injection axis 334.

In the exemplary embodiment, the nozzle 304 includes the inlet portion 308, the base 340, and the shield 342 that covers the base 340 to define the mixing chamber 344. The mixing chamber 344 includes the central region 346 that receives compressed gas 114 via the inlet flow paths 352 between adjacent vanes 350. The circumferentially-spaced vanes 350 extend generally axially from the base 340 to the shield 342. Each vane 350 has a generally axially-extending internal channel 354 and a plurality of substantially radially-oriented ports 356 on either side thereof. The channel 354 is in flow communication, via the ports 356, with at least one inlet flow path 352 directed into the mixing chamber 344.

The base 340 defines an internal plenum 358 that extends circumferentially about the duct 332. Fuel flows through the conduit fitting 306 to the internal plenum 358 and subsequently to the vane ports 356 via the internal channel 354 of each respective vane 350. In some embodiments, the vent portion 330 does not include a plurality of vanes 350 (i.e., the vent portion 330 may have only one vane 350 in some embodiments or may have vanes 350 located along a single side 362 or 364). In other embodiments, the base 340 and/or the internal plenum 358 does not extend circumferentially about the duct 332 (e.g., the base 340 and/or the internal plenum 358 may extend around less than half of the duct 332). Although, in the exemplary embodiment, each vane 350 and each internal channel 354 extends generally axially, and each port 356 is oriented substantially radially, other embodiments may provide any other suitable orientation for any of the vanes 350, the internal channels 354, and/or the ports 356.

FIG. 7 is a perspective view of an exemplary vane 350. In the exemplary embodiment, each vane 350 is generally teardrop- or airfoil-shaped and has a leading edge 370, a trailing edge 372, and a pair of sides 374 extending from leading edge 370 to trailing edge 372. Each vane 350 is oriented within the nozzle 304 radially outward of the mixing chamber 344 such that the leading edge 370 faces substantially radially-outward away from the central region 346, and such that the trailing edge 372 faces substantially radially-inward toward the central region 346.

In the exemplary embodiment, the ports 356 of each vane 350 are formed on the vane sides 374, such that each side 374 has its own respective row 376 of ports 356 that extends generally axially along vane 350 adjacent to leading edge 370. That is, each side 374 of the vane 350 has a row 376 of generally axially-spaced-apart ports 356 such that the rows 376 substantially oppose one another across the vane 350. Thus, each row 376 of the ports 356 is in fluid communication with a neighboring inlet flow path 352. In embodiments having ports 356 on each side 374 of the vane 350, each inlet flow path 352 receives fuel from ports 356 of the adjacent vanes 350 defining the inlet flow path 352.

In other embodiments, each vane 350 may have any suitable arrangement of ports 356 that enables the vane 350 to function as described herein (e.g., each vane 350 may have ports 356 on only one side 374, and/or ports 356 that are not arranged in generally axially-extending rows 376). Moreover, each vane 350 may not be generally airfoil-shaped in some embodiments, but instead may have any suitable shape that permits the vane 350 to function as described herein.

When the combustor 104 of the gas turbine assembly 100 is operated, compressed gas 114 flows into the environment 220 via the inlet end 216 of the first conduit 208. Compressed gas 114 within the environment 220 then flows into the nozzle 304 via the inlet flow paths 352 between the vanes 350 (i.e., compressed gas 114 flows substantially radially into the central region 346 of the mixing chamber 344 via inlet flow paths 352). Meanwhile, fuel 138 flows through the second conduit 210 into the internal plenum 358 of the base 340 via the conduit fitting 306, and then flows into the internal channels 354 of the vanes 350 before being discharged generally radially outward into the inlet flow paths 352 via the ports 356.

Separate streams of the discharged fuel 138 and compressed gas 114 flow through each inlet flow path 352 and are conveyed into the central region 346 of the mixing chamber 344. As the streams flow from the inlet flow paths 352, the streams mix together within the central region 346 before being channeled as the second mixture 132 through the duct 332 for injection into the secondary combustion zone of the combustion chamber 122.

In other embodiments, an internal plenum may be defined in the shield 342 in lieu of, or in addition to, the internal plenum 358 being defined in the base 340, such that the conduit fitting 306 is in flow communication with the internal channels 354 of the vanes 350 across the shield 342.

The methods and systems described herein facilitate enhanced mixing of fuel and compressed gas in a combustor. More specifically, the methods and systems facilitate positioning a fuel injection channel within a flow of compressed gas through a fuel injector, thereby enhancing the distribution of fuel throughout the compressed gas. Thus, the methods and systems promote mixing of fuel and compressed gas in a secondary fuel injector of an AFS system in a combustor assembly. The methods and systems therefore improve the overall operating efficiency of a combustor, such as a combustor in a turbine assembly. This increases the output and reduces the cost associated with operating a combustor, for example, a combustor in a heavy-duty, power-generating gas turbine assembly.

Exemplary embodiments of fuel injectors and methods of fabricating the same are described above in detail. The methods and systems described herein are not limited to the specific embodiments described herein, but rather, components of the methods and systems may be utilized independently and separately from other components described herein. For example, the methods and systems described herein may have other applications not limited to practice with turbine assemblies, as described herein. Rather, the methods and systems described herein can be implemented and utilized in connection with various other industries.

While the invention has been described in terms of various specific embodiments, those skilled in the art will recognize that the invention can be practiced with modification within the spirit and scope of the claims.

What is claimed is:

1. A fuel injector comprising:
a fuel conduit fitting; and
a nozzle comprising:
a fuel plenum defined internally in a base and in fluid communication with the fuel conduit fitting;
a shield parallel to the base and spaced apart from the base along an injection axis of the fuel injector, the injection axis defining an axial direction of the fuel injector;
an inlet region defining a mixing chamber therein, the mixing chamber being defined by a pair of oppositely disposed side walls connected by a pair of oppositely disposed end walls, wherein the pair of oppositely disposed side walls and the pair of oppositely disposed end walls partially define the base and extend in the axial direction opposite from the shield;
a plurality of vanes circumferentially spaced on a top surface of the base and defining therebetween a plurality of air flow paths in a radially inwardly direction into the mixing chamber, relative to the injection axis of the fuel injector;
wherein each vane of the plurality of vanes extends from the base to the shield, the each vane of the plurality of vanes comprising at least one port defined therein in flow communication with the fuel plenum such that fuel from the fuel conduit fitting is dischargeable into at least one of the air flow paths via the at least one port.

2. The fuel injector of claim 1, wherein the each vane of the plurality of vanes comprises an internal channel defined therein that is in flow communication with the fuel plenum such that the at least one port is in flow communication with the fuel conduit fitting across the fuel plenum and the internal channel.

3. The fuel injector of claim 1, wherein the each vane of the plurality of vanes is generally airfoil-shaped.

4. The fuel injector of claim 3, wherein the each vane of the plurality of vanes comprises a leading edge, a trailing edge, and a pair of sides extending from the leading edge to the trailing edge, the at least one port being defined on at least one side of the pair of sides; and wherein the trailing edge of the each vane of the plurality of vanes is oriented toward the mixing chamber and radially inward of the leading edge of the each vane of the plurality of vanes, relative to the injection axis of the fuel injector.

5. The fuel injector of claim 4, wherein the at least one port is one of a plurality of ports defined on each side of the pair of sides, the plurality of ports being arranged on each side of the pair of sides in a row that is adjacent the leading edge of the each vane of the plurality of vanes.

6. The fuel injector of claim 1, wherein a first group of the plurality of vanes disposed along a first side wall of the pair of oppositely disposed side walls of the mixing chamber is offset across the mixing chamber from a second group of the plurality of vanes disposed along a second side wall of the pair of oppositely disposed side walls of the mixing chamber.

7. The fuel injector of claim 1, wherein the each vane of the plurality of vanes comprises a leading edge and a trailing edge opposite the leading edge; and wherein the leading edge and the trailing edge are parallel to the injection axis of the fuel injector.

8. A method of fabricating a fuel injector, the method comprising:
forming a fuel conduit fitting; and
forming a nozzle that includes:
a fuel plenum defined internally in a base and in fluid communication with the fuel conduit fitting;
a shield parallel to the base and spaced apart from the base along an injection axis of the fuel injector, the injection axis defining an axial direction of the fuel injector;
an inlet region defining a mixing chamber therein, the mixing chamber being defined by a pair of oppositely disposed side walls connected by a pair of oppositely disposed end walls, wherein the pair of oppositely disposed side walls and the pair of oppositely disposed end walls partially define the base and extend in the axial direction opposite from the shield:
a plurality of vanes circumferentially spaced on a top surface of the base and defining therebetween a plurality of air flow paths in a radially inwardly direction into the mixing chamber, relative to the injection axis of the fuel injector;
wherein each vane of the plurality of vanes extends from the base to the shield, the each vane of the plurality of vanes comprising at least one port defined therein in flow communication with the fuel plenum, such that fuel from the fuel conduit fitting is dischargeable into at least one of the air flow paths via the at least one port.

9. The method of claim 8, wherein forming a nozzle comprises:
forming the each vane of the plurality of vanes to have an internal channel defined therein that is in flow communication with the fuel plenum such that the at least one port is in flow communication with the fuel conduit fitting across the fuel plenum and the internal channel.

10. The method of claim 8, wherein forming the nozzle comprises forming the each vane of the plurality of vanes to be generally airfoil-shaped.

11. The method of claim 10, wherein forming the each vane of the plurality of vanes to be generally airfoil-shaped comprises forming the each vane to have a leading edge, a trailing edge, and a pair of sides extending from the leading edge to the trailing edge, the at least one port being defined on at least one side of the pair of sides.

12. The method of claim 11, wherein forming the each vane of the plurality of vanes to be generally airfoil-shaped further comprises forming the at least one port on each side of the pair of sides; and wherein the at least one port is one of a plurality of ports, the plurality of ports being arranged on each side of the pair of sides in a row that is adjacent the leading edge.

13. The method of claim 8, wherein forming a nozzle comprises forming a first group of the plurality of vanes along a first side wall of the pair of oppositely disposed side walls of the mixing chamber to be offset across the mixing chamber from a second group of the plurality of vanes along a second side wall of the pair of oppositely disposed side walls of the mixing chamber.

14. A gas turbine assembly comprising:
a compressor; and
a combustor coupled in flow communication with the compressor, wherein the combustor comprises an axial fuel staging (AFS) system having a secondary fuel injector, the secondary fuel injector comprising:
a fuel conduit fitting; and
a nozzle comprising:
a fuel plenum defined internally in a base and in fluid communication with the fuel conduit fitting;

a shield parallel to the base and spaced apart from the base along an injection axis of the secondary fuel injector, the injection axis defining an axial direction of the secondary fuel injector;

an inlet region defining a mixing chamber therein, the mixing chamber being defined by a pair of oppositely disposed side walls connected by a pair of oppositely disposed end walls, wherein the pair of oppositely disposed side walls and the pair oppositely disposed of end walls partially define the base and extend in the axial direction opposite from the shield:

a plurality of vanes circumferentially spaced on a top surface of the base and defining therebetween a plurality of air flow paths in a radially inwardly direction into the mixing chamber, relative to the injection axis of the fuel injector;

wherein each vane of the plurality of vanes extends from the base to the shield, the each vane of the plurality of vanes comprising at least one port defined therein in flow communication with the fuel plenum such that fuel from the fuel conduit fitting is dischargeable into at least one of the air flow paths via the at least one port.

15. The gas turbine assembly of claim 14, wherein the each vane of the plurality of vanes comprises an internal channel defined therein that is in flow communication with the fuel plenum such that the at least one port is in flow communication with the conduit fitting across the fuel plenum and the internal channel.

16. The gas turbine assembly of claim 14, wherein the each vane of the plurality of vanes is generally airfoil-shaped.

17. The gas turbine assembly of claim 16, wherein the each vane of the plurality of vanes comprises a leading edge, a trailing edge, and a pair of sides extending from the leading edge to the trailing edge, the at least one port being defined on at least one side of the pair of sides; and wherein the trailing edge of the each vane of the plurality of vanes is oriented toward the mixing chamber and radially inward of the leading edge of the each vane of the plurality of vanes, relative to the injection axis of the fuel injector.

18. The gas turbine assembly of claim 17, wherein the at least one port is one of a plurality of ports, the plurality of ports being defined on each side of the pair of sides and being arranged in a row on each side of the pair of sides that is adjacent the leading edge of the each vane of the plurality of vanes.

19. The gas turbine engine of claim 14, wherein the each vane of the plurality of vanes comprises a leading edge and a trailing edge opposite the leading edge; and wherein the leading edge and the trailing edge are parallel to the injection axis of the fuel injector.

* * * * *